(12) United States Patent
Janon et al.

(10) Patent No.: US 8,888,142 B2
(45) Date of Patent: Nov. 18, 2014

(54) RELEASABLE CONNECTOR FOR AN OFF-SHORE OIL INSTALLATION

(75) Inventors: Franck Janon, Uffholtz (FR); Michael D. Hargrave, Montgomery, TX (US); Anne Ginet, Cernay (FR); Stéphane Buffy, Murbach (FR)

(73) Assignee: Techlam, Cernay (FR)

( * ) Notice: Subject to any disclaimer, the term of this patent is extended or adjusted under 35 U.S.C. 154(b) by 385 days.

(21) Appl. No.: 12/999,011

(22) PCT Filed: Jun. 19, 2009

(86) PCT No.: PCT/FR2009/000742
§ 371 (c)(1),
(2), (4) Date: Apr. 21, 2011

(87) PCT Pub. No.: WO2009/153462
PCT Pub. Date: Dec. 23, 2009

(65) Prior Publication Data
US 2011/0266792 A1 Nov. 3, 2011

(30) Foreign Application Priority Data

Jun. 19, 2008 (FR) .................................. 08 03424

(51) Int. Cl.
*F16L 27/04* (2006.01)
*E21B 17/01* (2006.01)
*E21B 33/038* (2006.01)
*E21B 43/01* (2006.01)

(52) U.S. Cl.
CPC ............. *E21B 43/0107* (2013.01); *E21B 17/01* (2013.01); *E21B 33/038* (2013.01)

USPC ............ 285/271; 285/225; 285/226; 285/268

(58) Field of Classification Search
USPC .............. 285/146.1, 261, 266, 271, 225–226, 285/263, 268
See application file for complete search history.

(56) References Cited

U.S. PATENT DOCUMENTS 1,373,515 A * 4/1921 Loomis ........................... 285/13
1,883,279 A * 10/1932 Zerk .............................. 285/9.2
(Continued)

FOREIGN PATENT DOCUMENTS

| EP | 0 302 546 A1 | 2/1989 |
| FR | 2 791 316 | 9/2000 |
| WO | WO 95/29839 A1 | 11/1995 |

OTHER PUBLICATIONS

International Search Report and Written Opinion for Application No. PCT/FR2009/000742 dated Feb. 11, 2010.

*Primary Examiner* — Aaron Dunwoody
*Assistant Examiner* — Fannie Kee
(74) *Attorney, Agent, or Firm* — Alston & Bird LLP

(57) ABSTRACT

A connector for an off-shore oil installation is provided. The connector is configured for connecting first and second tubular elements having a common axis along which a releasable connection is made by a ball-type connector that is axially engageable and that presents an inner cylindrical sleeve and an outer cylindrical sleeve. The first tubular element constituting an inner connection element terminating at a downstream end and being received in a complementary region of the outer second tubular element. The connector includes a laminated ball joint having a center of rotation situated on the common axis and secured to one of the tubular elements.

3 Claims, 3 Drawing Sheets

(56) References Cited

U.S. PATENT DOCUMENTS

| | | | |
|---|---|---|---|
| 1,929,635 A * | 10/1933 | Goff | 285/266 |
| 2,417,491 A * | 3/1947 | Hill | 285/121.7 |
| 3,680,895 A * | 8/1972 | Herbert et al. | 285/146.3 |
| 4,068,868 A * | 1/1978 | Ohrt | 285/263 |
| 4,121,861 A * | 10/1978 | Gorndt | 285/223 |
| 4,273,363 A * | 6/1981 | Angel | 285/47 |
| 4,432,670 A * | 2/1984 | Lawson | 405/224 |
| 4,643,472 A | 2/1987 | Schukei et al. | |
| 4,842,059 A * | 6/1989 | Tomek | 166/65.1 |
| 4,846,509 A * | 7/1989 | Moore | 285/225 |
| 4,907,914 A | 3/1990 | Gunderson et al. | |
| 4,943,188 A | 7/1990 | Peppel | |
| 7,246,760 B2 * | 7/2007 | Marty et al. | 239/587.4 |
| 7,341,283 B2 * | 3/2008 | Moses et al. | 285/226 |
| 2005/0167978 A1 * | 8/2005 | Moses et al. | 285/223 |

\* cited by examiner

RELEASABLE CONNECTOR FOR AN OFF-SHORE OIL INSTALLATION

CROSS REFERENCE TO RELATED APPLICATION

This application is a national stage of International Application No. PCT/FR2009/000742, filed Jun. 6, 2009, which in turn claims the benefit of French Application No. 08 0424, filed Jun. 19, 2008.

FIELD OF THE INVENTION

The present invention relates to a releasable connector for an off-shore oil installation of the type presenting an axially snap-fastening ball-type connector to connect one tubular element to another tubular element that is fastened to the sea bottom.

BACKGROUND OF THE INVENTION

Various types of connector for use in such an application have already been proposed.

One of them is a connector with rotary coupling as described in U.S. Pat. No. 4,943,188 and U.S. Pat. No. 4,907,914. Coupling is obtained by a downward movement and then an upward movement during which sloping surfaces of a receptacle of the connector cause the male portion to turn on its axis, thereby enabling connection fingers to lock in complementary elements of the receptacle.

That type of connector presents various drawbacks, including its size and the complexity of making it industrially.

Connectors also exist that do not turn during connection, in particular the ball-type connectors as disclosed in U.S. Pat. No. 4,643,472. That connector makes use of the well-known principle of balls locking against ramps. The male portion comprises a shaft with sloping regions that is surrounded by a cylindrical sleeve presenting holes that face the sloping regions of the shaft, a respective ball being housed in each of these holes. Locking is obtained by the fact that the balls become jammed against the sloping surfaces. Locking or unlocking of the balls, and thus of the connector, is achieved by moving the cylindrical sleeve axially in order to lock or release the balls.

The problem posed by that type of connector is that although connection and disconnection operations are made easier compared with rotary-coupling connectors, docking requires precision alignment that is not easily obtained in the intended application, and bending stresses are not accommodated and may lead to a large amount of fatigue in the risers.

SUMMARY OF THE INVENTION

An object of the present invention is to provide a connector of the above-specified type in which axial alignment constraints are made easier to a large extent without harming the locking performance of the connector.

The invention thus provides a connector for an off-shore oil installation for connecting first and second tubular elements having a common axis along which a releasable connection is made by means of a ball-type connector that is axially engageable and that presents an inner cylindrical sleeve and an outer cylindrical sleeve, the first tubular element constituting an inner connection element terminating at a downstream end and being received in a complementary region of the outer second tubular element, the connector being characterized in that it includes a laminated ball joint having a center of rotation situated on said common axis and secured to one of the tubular elements.

In a first embodiment that minimizes its axial size, the connector is characterized in that the laminated ball joint is situated inside the inner cylindrical sleeve of the ball-type connector, the laminated ball joint and the inner cylindrical sleeve being secured to the first tubular element, while the outer cylindrical sleeve constitutes said complementary region of the second tubular element.

This embodiment enables the swiveling center of the connector to be close to the connection region of the connector, thereby reducing the bending moments to which the connector is subjected, and allowing the laminated ball joint to be removed.

Preferably, the center of rotation of the laminated ball joint is situated at the downstream end of the inner cylindrical sleeve, thereby minimizing the axial size and also the bending moment to which the connector is subjected.

In a second embodiment that enables the swiveling center to be lowered, the connector is characterized in that the laminated ball joint is secured via an outer region of a connection plate, and in that it includes a tubular coupling mounted inside the laminated ball joint and secured thereto, the tubular coupling including an extension constituting a said complementary region in which the first tubular element is received.

In a third embodiment that makes it possible both to remove the laminated ball joint and to provide a ball-type connector of diameter that is less than or equal to that of the laminated ball joint, the connector is characterized in that the laminated ball joint is secured by an inner region of the first tubular element and by an outer region of a plate that surrounds the laminated ball joint and that carries the inner cylindrical sleeve of the ball-type connector, the plate presenting a passage at a first end for passing the first tubular element, the inner cylindrical sleeve extending from a second end of the plate that is opposite from the first end.

The laminated ball joint is advantageously fastened by an inner ring to a flared region presenting a concave hemispherical region. A stationary cylindrical sleeve acts as an abutment for holding the laminated ball joint in position in its housing under all circumstances, including while making a connection.

BRIEF DESCRIPTION OF THE DRAWINGS

Other characteristics and advantages appear on reading the following description with reference to the drawings in which.

DETAILED DESCRIPTION OF THE INVENTION

Figure 1:
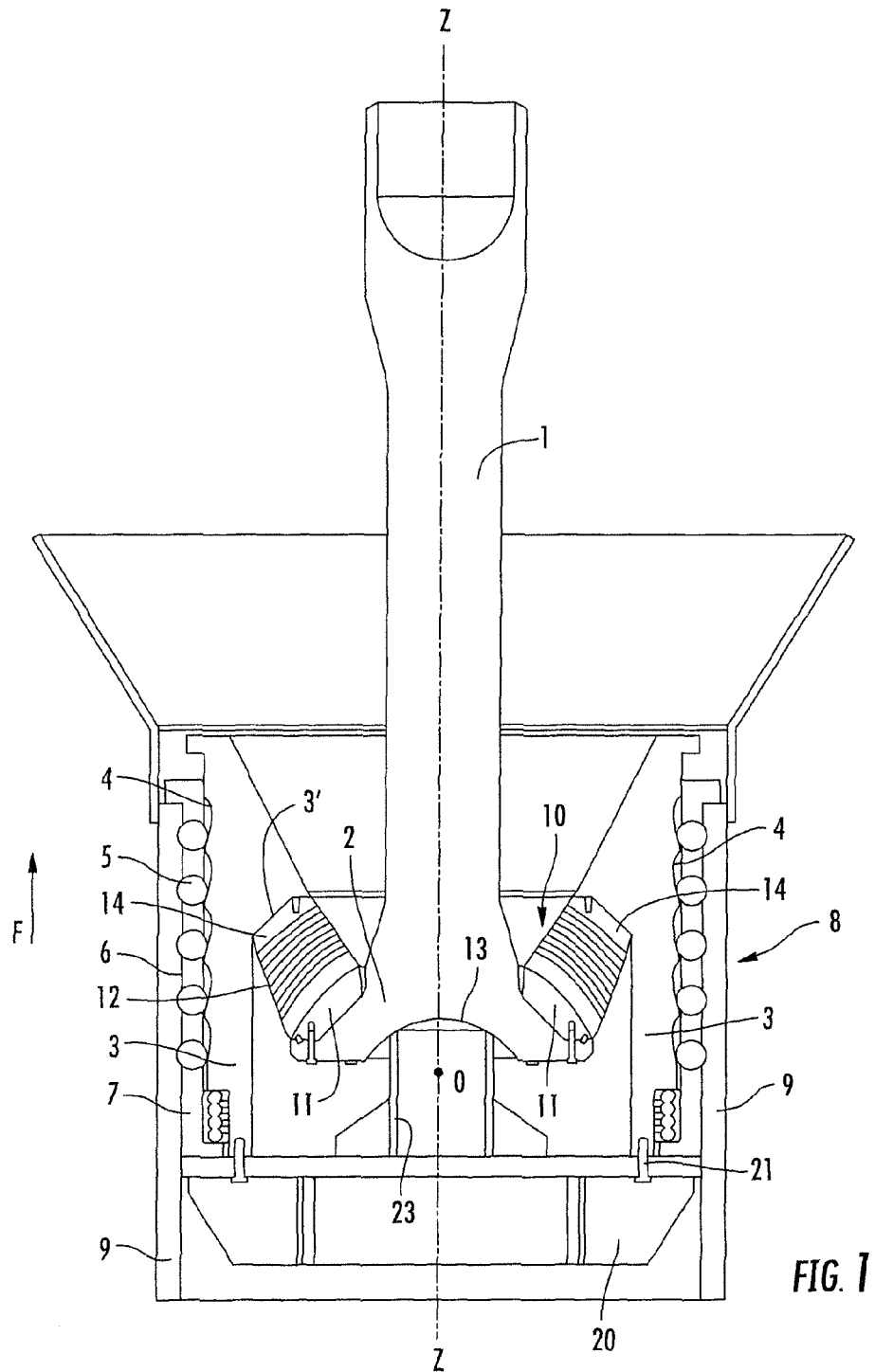
FIGS. 1 to 2 show examples respectively of the first, second, and third embodiments specified above.

In FIG. 1, the flared end 2 of a first tubular element 1 that is connectable to a tensioned metal anchor line (or tension leg) is fastened on the inside ring 11 of a laminated ball joint 10 presenting a stack 12 of alternating metal layers and elastomer layers. The outside ring 14 of the laminated element 10 is fastened to the inside of a frustoconical region 3' of a cylindrical sleeve 3 of outline including sloping regions 4 for receiving the balls 5 of a ball-type connector 8. The balls 5 are housed in openings 6 in a cylindrical sleeve 7 carried by the second tubular element 9 and sliding therealong. When the connector is put into place, the tubular element 9 is welded to a part that is anchored to the sea bottom. The sleeve 7 is movable in translation along the axis ZZ' of the connector to lock or unlock the balls 5. A plate 20 fastened by screws 21 holds the ball-type connector 8. Once the connector is mounted and the metal element is under tension in the direction of arrow F, the connector is free to act as a ball joint, since the region 13 is then released from the abutment 23.

This configuration in which the laminated ball joint 10 is preferably housed in a central position inside the ball-type connector 8 serves to minimize the axial length of the connector. In addition, the center of rotation O of (or of swiveling) of the laminated ball joint 10 is situated in the vicinity of the ball-type connector 8, thereby reducing the bending moments that need to be withstood by the connector. This configuration also makes it possible to remove the laminated ball joint should disassembly be necessary.

As in FIG. 1, a tubular element 1' is fastened via its flared end 2 to the inside ring 11 of the laminated ball joint 10. However, unlike FIG. 1, this tubular element 1' is secured to the female portion of the connector and presents an extension 1" that receives the male portion 40 for connecting to a tension leg and that carries the ball-type connector 8. The possibility of swiveling is conserved in the laminated ball joint 10.

Figure 2:
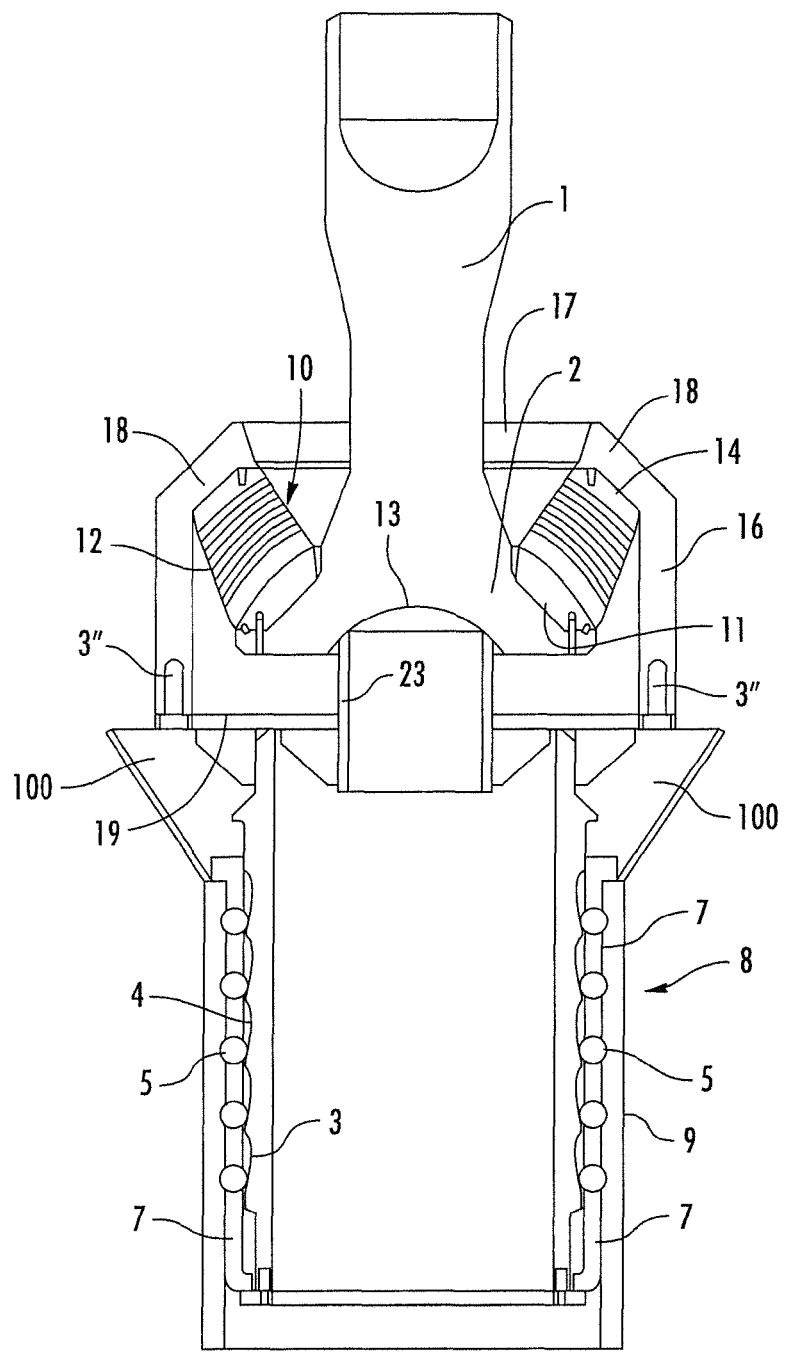

In FIG. 2, the ball-type connector 8 is carried by the cylindrical sleeve 9 (as in FIG. 1). A plate 16 surrounds the end of the first tubular element 1 that is connectable to a tension leg, and the laminated ball joint 10 presents an opening 17 through which the tubular element 1 passes. The laminated ball joint 10 is fastened via its inside ring 11 to the flared end 2 of the tubular element 1, and via its outside ring 14 to a frustoconical region 18 of the plate 16. At the end 19 opposite from the opening 17 and to which the abutment 23 is fastened, the cylindrical sleeve 3 of the ball-type connector 8 is fastened to the plate 16 via a flared region 100 and screws 3".

This configuration enables the ball-type connector 8 to have a radial dimension that is smaller than or equal to the radial dimension of the laminated ball joint 10 while limiting its axial size.

Since the swiveling center of the ball joint 10 remains quite close to the connection zone of the ball-type connector 8, the bending moments applied to the connector are limited.

The invention claimed is:

1. A connector axially engageable for an off-shore oil installation configured to connect in a releasable manner first and second tubular elements having a common axis, wherein said connector comprises:
    balls;
    a cylindrical sleeve including sloping regions for receiving the balls;
    a cylindrical sleeve including openings in which the balls are housed;
    a laminated ball joint having a center of rotation situated on said common axis;
    an inner region; and
    an outer region,
    one of the inner region and the outer region being secured to the cylindrical sleeve including the sloping regions, the other of the inner region and the outer region being configured to be secured to one of the first and second tubular elements, and the cylindrical sleeve including the openings being configured to be carried by the other of the first and second tubular elements and sliding therealong.

2. The connector according to claim 1, wherein the laminated ball joint is situated inside the cylindrical sleeve including the sloping regions, the laminated ball joint is secured to the cylindrical sleeve including the sloping regions via the outer region and is secured to the first tubular element via the inner region.

3. A connector according to claim 1, wherein the laminated ball joint is secured by the inner region to the first tubular element and by the outer region to a plate that surrounds the laminated ball joint and that carries the cylindrical sleeve including the sloping regions, the plate presenting a passage at a first end for passing the first tubular element, the cylindrical sleeve including the sloping regions extending from a second end of the plate that is opposite from the first end.

* * * * *

UNITED STATES PATENT AND TRADEMARK OFFICE
CERTIFICATE OF CORRECTION

PATENT NO.        : 8,888,142 B2  
APPLICATION NO.   : 12/999011  
DATED             : November 18, 2014  
INVENTOR(S)       : Janon et al.

Page 1 of 1

It is certified that error appears in the above-identified patent and that said Letters Patent is hereby corrected as shown below:

On the title page column 2, under the abstract "3 Claims, 3 Drawing Sheets" should read --3 Claims, 2 Drawing Sheets--.

Figure 3:
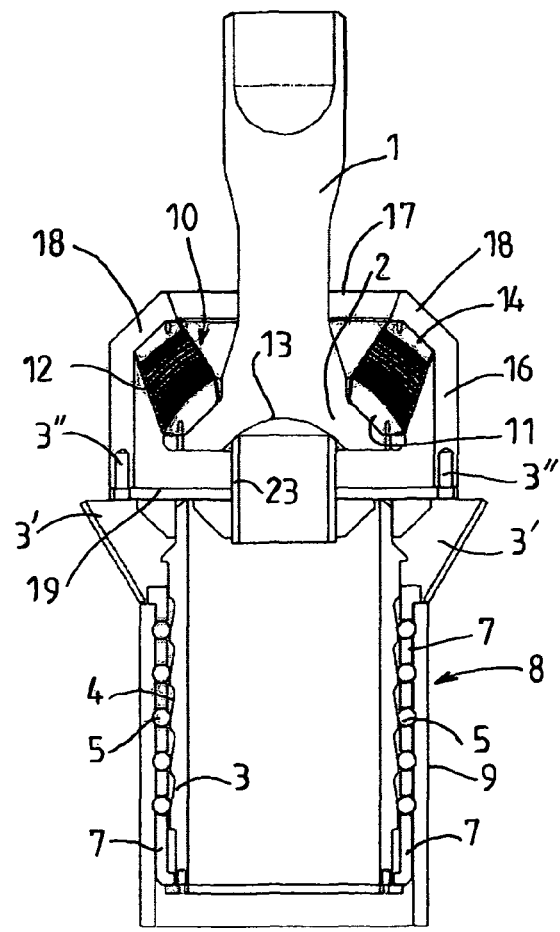

In the Drawings:

Sheet 3, FIG. 3, should be deleted.

Signed and Sealed this  
Fifth Day of May, 2015

Michelle K. Lee  
*Director of the United States Patent and Trademark Office*